United States Patent
Clasen et al.

(10) Patent No.: US 6,178,293 B1
(45) Date of Patent: *Jan. 23, 2001

(54) METHOD AND AN APPARATUS FOR IMPROVING HEAT TRANSFER

(75) Inventors: Peter Clasen, Krefeld; Hans-Joachim Brockhaus, Meerbusch; Clemens Casper, Krefeld; Karl-Heinz Jonen, Duisburg, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/083,421

(22) Filed: May 22, 1998

(30) Foreign Application Priority Data

May 28, 1997 (DE) ............................................. 197 22 360

(51) Int. Cl.⁷ ................................. F28D 7/00; F28D 15/00
(52) U.S. Cl. ....................................... 392/496; 165/104.29
(58) Field of Search .................................... 392/496, 466, 392/482, 483; 165/104.11, 104.24, 104.28, 104.29, 132, 159, DIG. 346, DIG. 517

(56) References Cited

U.S. PATENT DOCUMENTS

| | | |
|---|---|---|
| 4,050,507 | 9/1977 | Che et al. . |
| 4,471,833 * | 9/1984 | Yabe et al. ............................... 165/1 |
| 5,030,327 | 7/1991 | Lee . |
| 5,054,548 * | 10/1991 | Zohler .................................. 165/133 |

FOREIGN PATENT DOCUMENTS

| | | |
|---|---|---|
| 3 85 115 | 2/1988 | (AT) . |
| 0 275 029 | 7/1988 | (EP) . |
| 938073 | 9/1963 | (GB) . |
| 2124742 | 2/1984 | (GB) . |

OTHER PUBLICATIONS

Fundamentals of Heat and Mass Transfer/Frank P. Incropera, David De Witt.—3rd ed., 589–599, 1990.*

* cited by examiner

Primary Examiner—Teresa Walberg
Assistant Examiner—Thor Campbell
(74) Attorney, Agent, or Firm—Norris, McLaughlin & Marcus, P.A.

(57) ABSTRACT

In a method for improving heat transfer in a heat exchanger, in which a heating medium passes through heat exchange elements 1,8 which transfer their heat to a liquid with which they are in contact and which is located in the jacket region 3 of the heat exchanger, the liquid between the heat exchange elements in the jacket region 3 is heated locally to such a high temperature by means of additional heating elements 2,9 that nucleate boiling occurs in the liquid on the surface of these additional heating elements 2,9 and the resulting vapour bubbles ascend between the normal heating exchange elements 1,8 in the jacket region 3. For this purpose an evaporative condenser containing vertically superimposed heat exchange elements 1,8 extending in a horizontal direction and a shell enclosing the jacket region 3 of the heat exchange elements 1,8 is provided, in which additional heating elements 2,9 connected to a heating medium circuit which is separate from the heat exchange elements 1,8 are arranged beneath the heat exchange elements 1,8, preferably in the bottom third of the vertical arrangement.

10 Claims, 2 Drawing Sheets

METHOD AND AN APPARATUS FOR IMPROVING HEAT TRANSFER

Figure 1:
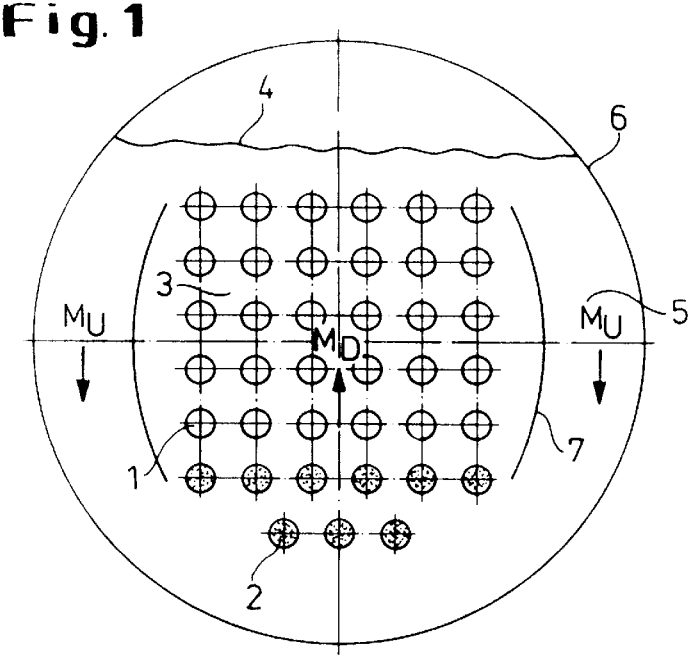

The present invention relates to a method and an apparatus for improving heat transfer in a heat exchanger, in which a heating medium flows through heat exchange elements which transfer their heat to a liquid with which they are in contact and which is located in the jacket region of the heat exchanger. The invention relates to a method for improving heat transfer on the surface of heating elements (pool boiling) in processes where the heat flow density and wall overheating is low and no bubble vaporization takes place on the surface of the heating elements. In such cases the heat on the surface of the heating elements is only transferred by free convection and heat transfer is usually poor.

In evaporator boilers the vaporization of liquids on heating surfaces takes place on flat horizontal or vertical heating walls or on the surfaces of tube bundles. The heating elements can be heated either by a fluid or by means of electric or nuclear energy (cf. for example the VDI heat atlas, 4th Edition, Section Ha). Such apparatuses are designed using known calculation methods or on the basis of experiments. Where the overheating of the walls is sufficiently high, bubble vaporization takes place on the surfaces of the heating walls. In such cases the heat transfer coefficient is usually relatively high and the required heating area relatively small for a given apparatus capacity. Where the temperature differences between the surfaces of the heat exchange elements and the boiling temperature of the surrounding liquid are less than 20° C., and particularly less than 2 to 10° C., no bubble vaporization usually takes place on the heating walls. In such cases the heat is only transferred via heat conduction and convection. The heat transfer coefficient on the heat exchange surfaces is in such cases relatively low, as a result of which the dimensions of the required heating surface area and the volume of the apparatus have to be relatively high.

In refrigeration technology, horizontal tube bundles are used where the differences between the temperature of the heating walls and the boiling temperature of the fluid are small. These horizontal tube bundles are sprinkled with the refrigerating medium to be evaporated [cf. for example R. Billet: "Verdampfung und ihre technischen Anwendungen" (Evaporation and its technological applications), Verlag Chemie (1983)]. In order to avoid dry areas on the tubes, the quantity of refrigerant sprinkled must be larger than the quantity of liquid evaporated. In general the refrigerant is circulated several times with the aid of a pump. Usually pumps are subject to wear. Also, they have to have a corresponding inlet height when conveying boiling liquids.

The invention is based on the problem of considerably improving heat transfer where small differences in temperature exist between the surfaces of the heat exchange elements and the boiling temperature of the adjacent liquid (low wall overheating), thus resulting in low heat flow densities on the heat exchange surface. In the present instance (i.e. in the context of the present invention) "small differences in temperature" are understood to refer to such low overheating of the walls that bubble vaporization does not occur on the surfaces of the heat exchange elements.

According to the invention this problem is solved by heating the liquid between the heat exchange elements in the jacket region locally to such a high temperature by means of additional heating elements that nucleate boiling occurs on the surfaces of these additional heating elements and the vapour bubbles formed ascend between the main heat exchange elements in the jacket region.

The bubbles formed thus flow upwards between the other heating elements on which no bubble vaporization takes place. Due to the ascending bubbles an increase in convection takes place and the heat transfer on all of the heat exchange elements is consequently improved. The vapour bubbles escape from the surface of the liquid. The bubble-free liquid, which has a higher density than the bubble-containing liquid between the heating elements flows downwards outside the region of the heating elements. Circulating flow is thus produced in the evaporator.

Preferably the difference in temperature $\Delta T_H$ between the surfaces of the additional heating elements and the boiling temperature of the surrounding liquid is more than 10° C., and in particular more than 20° C.

The additional heating elements can be advantageously heated electrically or with the aid of fluids, gases or condensing vapours as the heating media. In particular, the heating medium used can be gaseous chlorine, chlorine condensed in the additional heating elements, or another refrigerant.

According to a special embodiment the method according to the invention is advantageously carried out in a heat exchanger for condensing chlorine vapours containing inert gases, in which the liquid present in the jacket region also consists of liquid chlorine and the combined heat exchange and jacket region is operated in the form of a chlorine recuperator. Liquefied chlorine is continuously introduced into the jacket region, evaporated as a result of the thermal energy introduced via the heat exchanger and is then continuously discharged once again in the form of chlorine gas, while gaseous chlorine is introduced into the heat exchange elements as the heating medium which at least partially condenses on passing through the heat exchange elements acting as evaporative condensers for the gaseous chlorine and is discharged continuously in the form of liquefied chlorine.

The apparatus for carrying out the abovementioned method is based on an evaporative condenser containing vertically superimposed heat exchange elements extending in a horizontal direction and a shell enclosing the jacket region of the heat exchange elements and is characterized according to the invention by additional heating elements which are arranged below or between the heat exchange elements, preferably in the bottom third of the vertical arrangement, and are connected to a heating medium circuit which is separate from the heat exchange elements.

Preferably the heat exchange elements consist of tubes arranged parallel to the axis of the shell.

Alternatively the heat exchange elements can also consist of hollow plates having vertically orientated heat exchange surfaces and arranged parallel to the axis of the shell.

The additional heating elements used are appropriately in the form of electrically heatable heating elements arranged parallel to the axis of the shell or in the form of tubes through which a heating medium flows.

In one embodiment which has proven to be particularly advantageous, guiding plates are arranged on both sides of the heat exchange elements in order to promote circulating flow within the vessel similar to a loop reactor. The guiding plates form a dividing line between a region of upward flow containing the heat exchange elements and a region of downward flow formed outside the region of the heat exchange elements.

In evaporators in which no bubble vaporization occurs on the surfaces of the heating elements as a result of a small difference in temperature between the surfaces and the boiling point of the adjacent liquid, the heat transfer can be considerably improved in the entire apparatus as a result of the abovementioned additional heating elements.

It has been found that, given identical conditions, even a small number of additional heating elements are sufficient to obtain a multifold improvement in the average heat exchange coefficient of a tube bundle compared with that obtained by free convection without any bubble formation. The required heating surface area and volume of the apparatus can be considerably reduced as a result of this feature. The abovementioned additional heating elements are suitable both for evaporators containing horizontal tube bundles and for vertically arranged plate elements.

In the following the invention is described in more detail by means of practical examples and diagrams.

Figure 2:
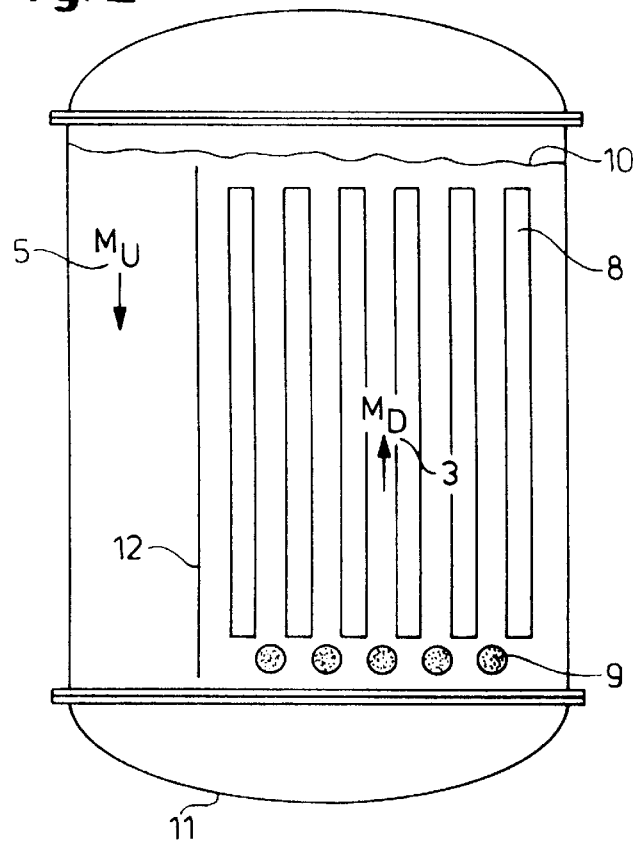
Figure 3:
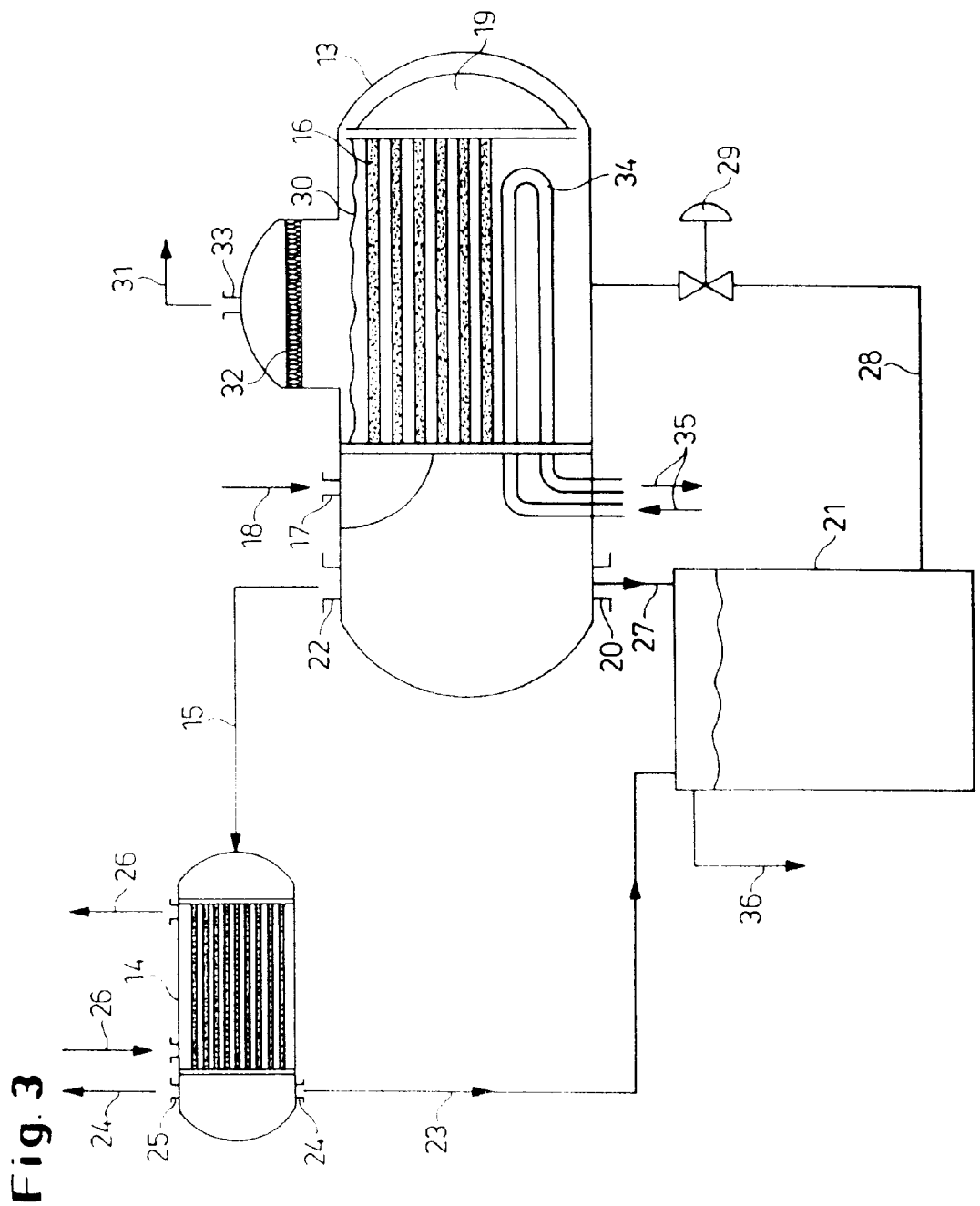

FIG. 1 is a heat exchanger with additional heating means, in which the heat exchange elements consist of horizontally arranged tubes, FIG. 2 is a heat exchanger with additional heating means, in which the heat exchange elements consist of vertical hollow plates and FIG. 3 is a flow sheet for the operation of a chlorine recuperator.

In the evaporator shown in cross-section in FIG. 1, chlorine containing inert gases is liquefied in tubes 1 at a pressure of approx. 5.3 $bar_{abs}$. The maximum condensation temperature is +11° C., which falls as the quantity of liquefied chlorine increases, since the proportion of inert gases increases. In the jacket region 3 of the evaporator (i.e. the region between the tubes 1) the liquefied chlorine evaporates. The pressure above the liquid chlorine is approx. 3.4 $bar_{abs}$. The average boiling point in the jacket region of the tube bundle is approx. −1 to −20° C. The chlorine not condensed in tubes 1 is liquefied further in heat exchangers (not shown) arranged downstream. Given these small temperature differences between the condensing and the evaporating chlorine no bubble vaporization takes place on the tube surfaces. Below the tube bundle or in the bottom region of the tube bundle some of the tubes 2 are heated by other means, such as for example by condensed refrigerants from the condensers arranged downstream or by hot water as the heating medium. The temperature of the heating medium is so high that the difference in temperature $\Delta T_H$ between the surfaces of these additional heating elements and the boiling temperature of the surrounding liquid becomes so high that bubble vaporization (nucleate boiling) occurs on the surfaces of the additional heating elements. This is usually the case when wall overheating of more than 5 to 10° C., and preferably more than 20° C., occurs. The vapour bubbles (vapour $M_d$) ascend between the tubes 1 of the heat exchanger tube bundle and escape from the surface of the liquid 4. The liquid 5 (stream $M_u$) which is free of bubbles or contains only a small number of bubbles flows downwards between the jacket of the apparatus 6 and the tube bundle. In order to promote (improve) this circulating flow guiding plates 7 are arranged between the tube bundle consisting of tubes 1 and the shell of the apparatus 6.

In the evaporator shown in FIG. 2, which contains plate-like heat exchange elements 8 (hollow plates), additional heating elements consisting of tubes 9 are arranged beneath the aforementioned elements in a similar manner to the embodiment of FIG. 1. The additional heating elements are heated electrically or by means of a heating medium of such a high temperature that bubble vaporization takes place on their surfaces. The vapour 3 produced (stream $M_d$) ascends between the elements 8, as in the example described above and escapes from the surface 10 of the liquid. The liquid 5 (stream $M_u$), which is free from or contains only a small number of bubbles, flows downwards in the intermediate region between the housing wall 11 and the outermost heating elements. In order to improve the resulting circulating flow, one or more guiding plates 12 are arranged in the jacket region.

The additional heating elements 2 (of FIG. 1) and 9 (of FIG. 2) can also be arranged in the bottom region of the heat exchange elements 1 (i.e. inside the tube bundle) and 8 (i.e. between the hollow plates). In the present context the "bottom region" is understood to be approx. one third of the total height of the tube bundle or of the vertically arranged hollow plates. In both cases the heating medium is introduced via a heating circuit which is separate from the main heating exchange elements 1 and 8. FIG. 3 shows a heat exchanger 13 for the recuperative liquefaction/evaporation of pure and inert-gas-containing vapours (such as for example chlorine) and a cooling system 14 connected thereto which is for example designed in the form of one or more stages and is used for the further condensation of vapours of the residual gases 15 which are not condensed in the heat exchanger 13. A heat exchanger containing a horizontal removable tube bundle 16 is shown as an example of a recuperator with additional heating. Inert-gas-containing chlorine 18 enters the recuperator via inlet 17. In the illustrated example this chlorine/inert gas mixture flows first of all through the upper tubes of the tube bundle 16 and then, after being deflected in the deflection chamber 19, through the bottom tubes. The chlorine 27 condensed in the tubes leaves the heat exchanger 13 or recuperator via outlet 20 and is discharged into a receiver 21. The chlorine/inert gas mixture 15 not condensed in the heat exchanger 13 leaves the heat exchanger 13 via outlet 22. In the heat exchange system 14 an additional portion of the chlorine is condensed. The chlorine 23 liquefied in the heat exchange system 14 leaves the heat exchanger 14 via outlet 24 and is also appropriately discharged into receiver 21. The residual gases 24 not liquefied in the heat exchange system 14 are removed via outlet 25. The cooling medium 26 used for the heat exchange system 14 can for example be water, boiling Freons or boiling chlorine of a pressure lower than in the jacket region of the recuperator 13. In order to cool the vapour/inert gas mixture 18 the liquefied chlorine 27 or 28 is evaporated in the jacket region of the heat exchanger 13 at a pressure which is lower than the pressure of the mass stream 18. From receiver 21 the liquid chlorine 28 passes via a throttle valve 29 into the jacket region of the heat exchanger 13. The quantity of the liquid phase (liquid chlorine) 28 present in the recuperator is controlled by means of the liquid level 30 in the jacket region of the heat exchanger 13. The vapour 31 formed in the jacket region of the heat exchanger 13 then appropriately passes through a mist collector 32. The vapour 31 then leaves the heat exchanger 13 via outlet 33.

The additional heating required for the generation of nucleate boiling in heat exchanger 13 is in this case obtained via hairpin tubes 34, through which a heating liquid 35 or a condensing vapour flows as the heating medium which appropriately consists of coolant 26 which has been evaporated in the heat exchange system 14 and then compressed. Since the volume stream 28 leaving the receiver 21 is generally smaller than the sum of the volume streams 27 and 23, the excess quantity 36 is discharged for example into a storage tank for liquid chlorine.

What is claimed is:

1. A method for improving heat transfer in a heat exchanger, in which a heating medium passes through heat exchange elements (1,8) which transfer their heat to a liquid with which they are in contact and which is located in the jacket region (3) of the heat exchanger, characterized in that the liquid between the heat exchange elements in the jacket region (3) is heated locally by additional heating elements (2,9) to such a high temperature that nucleate boiling occurs in the liquid on the surfaces of these additional heating elements (2,9) and the vapour bubbles formed ascend between the main exchange elements (1,8) in the jacket region (3).

2. A method according to claim 1, characterized in that the temperature difference $\Delta T_H$ between the surface of the additional heating elements (2,9) and the boiling temperature of the surrounding liquid is more than 10° C., and preferably more than 20° C.

3. A method according to claim 1, characterized in that the additional heating elements (2,9) are heated electrically or with the aid of liquids, gases or condensing vapours as the heating media.

4. A method according to claim 3, characterized in that the heating medium used is gaseous chlorine, chlorine condensed in the additional heating elements (2,9) or another refrigerant.

5. A method according to claim 3, characterized in that the liquid present in the jacket region also consists of liquid chlorine and the combined heat exchange (13) and jacket region is operated in the form of a chlorine recuperator, wherein liquefied chlorine (28) is continuously introduced into the jacket region and is evaporated as a result of the thermal energy introduced via the heat exchanger and is removed again continuously in the form of chlorine gas (15), while gaseous chlorine (18) is introduced into the heat exchange elements (16) in the form of a heating medium and at least partially condenses on passing through the heat exchange elements, which act as evaporative condensers for the gaseous chlorine, and is removed continuously in the form of liquefied chlorine (27).

6. An apparatus for carrying out the method according to claim 1, consisting of an evaporative condenser containing vertically superimposed heat exchange elements (1,8) extending in a horizontal direction and a shell which encloses jacket region (3) of the heat exchange elements (1,8), characterized in that additional heating elements (2,9) connected to a heating medium circuit which is separate from the heat exchange elements (1,8) are arranged beneath or between the heat exchange elements (1,8) and preferably in the bottom third of the vertical arrangement.

7. An apparatus according to claim 6, characterized in that the heat exchange elements consist of tubes (1) arranged parallel to the axis of the shell.

8. An apparatus according to claim 6, characterized in that the heat exchange elements consist of hollow plates (8) which have vertically orientated heat exchange surfaces and are arranged parallel to the axis of the shell.

9. An apparatus according to claim 7, characterized in that the additional heating elements consist of electrically heatable heating elements arranged parallel to the axis of the shell or of tubes through which a heating medium flows.

10. An apparatus according to claim 6 characterized in that in order to produce circulating flow in the shell similar to a loop reactor guiding plates (7,12) are arranged on both sides of the heat exchange elements (1,8) which form a dividing line between a flow region of upward flow $M_D$ containing the heat exchange elements and a flow region of downward flow $M_U$ formed outside the region of the heat exchange elements.

* * * * *